C. E. JOHNSON.
DUST SPRAYING MACHINE.
APPLICATION FILED OCT. 17, 1913.
1,135,288.
Patented Apr. 13, 1915.
3 SHEETS—SHEET 1.
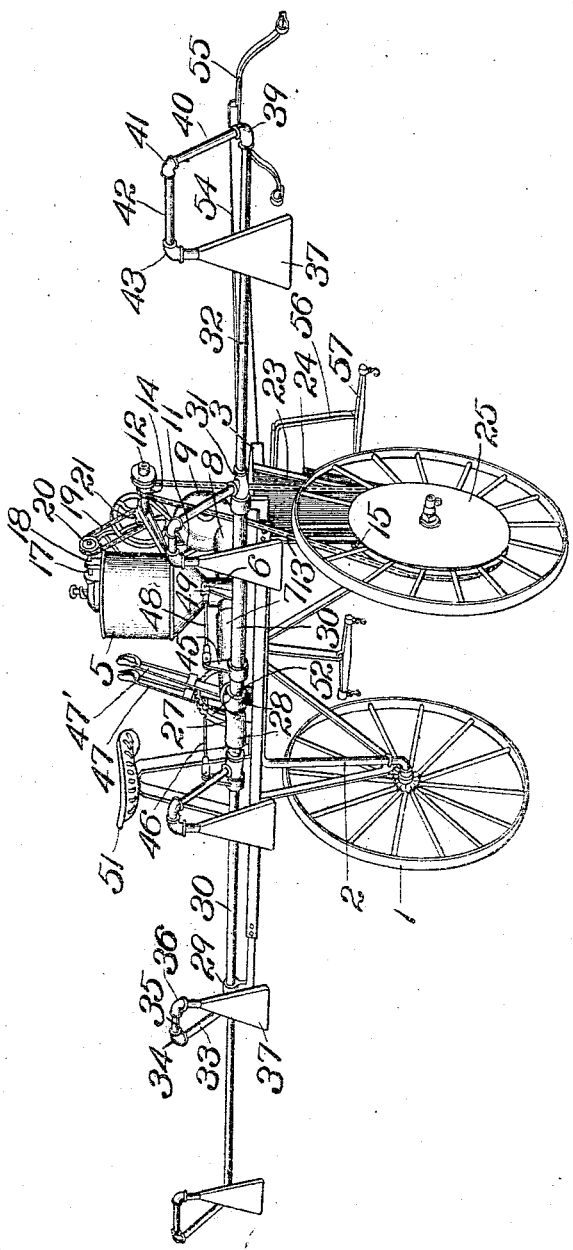
WITNESSES:
Arthur W. Caps.
L. E. Coats.
INVENTOR
C. E. Johnson.
Arthur C. Brown
ATTORNEY

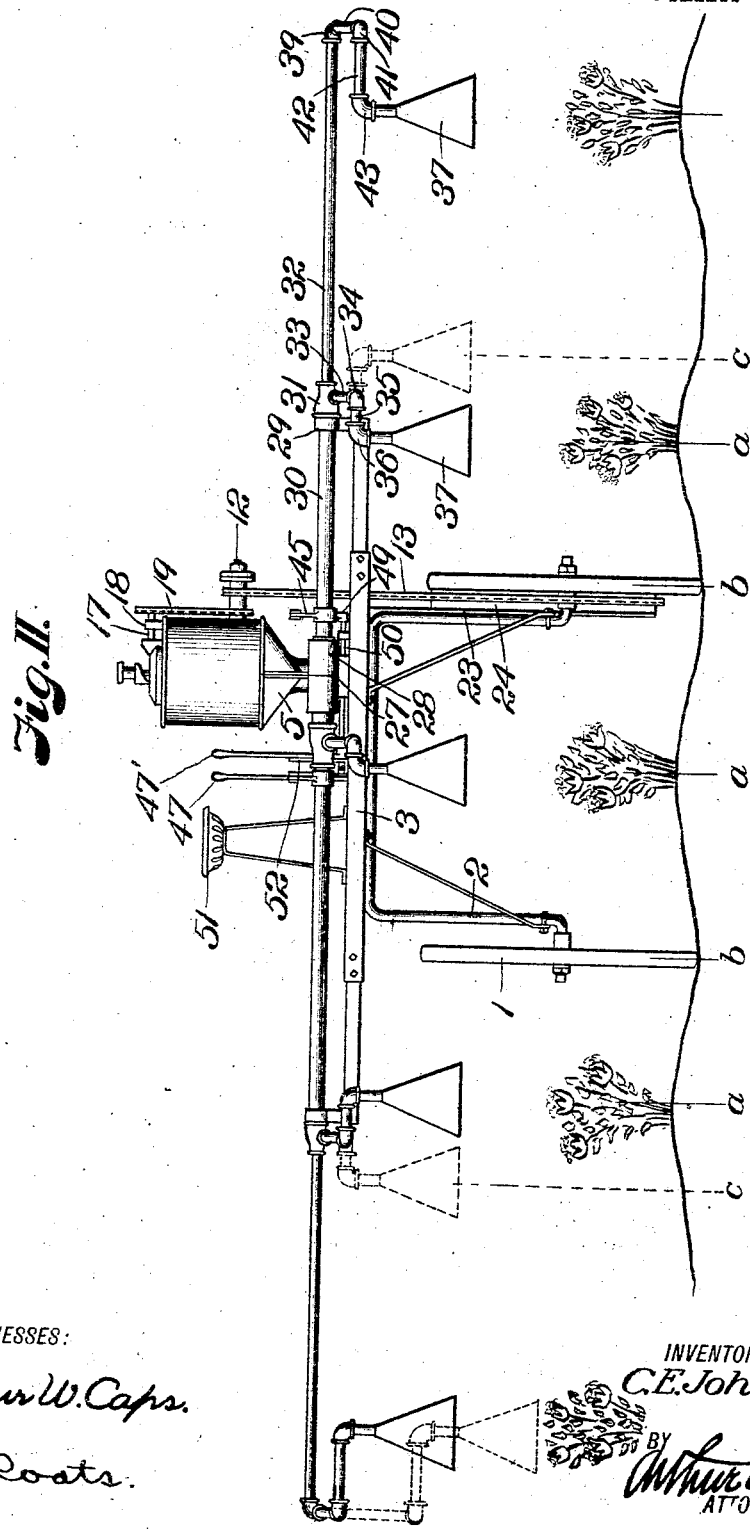

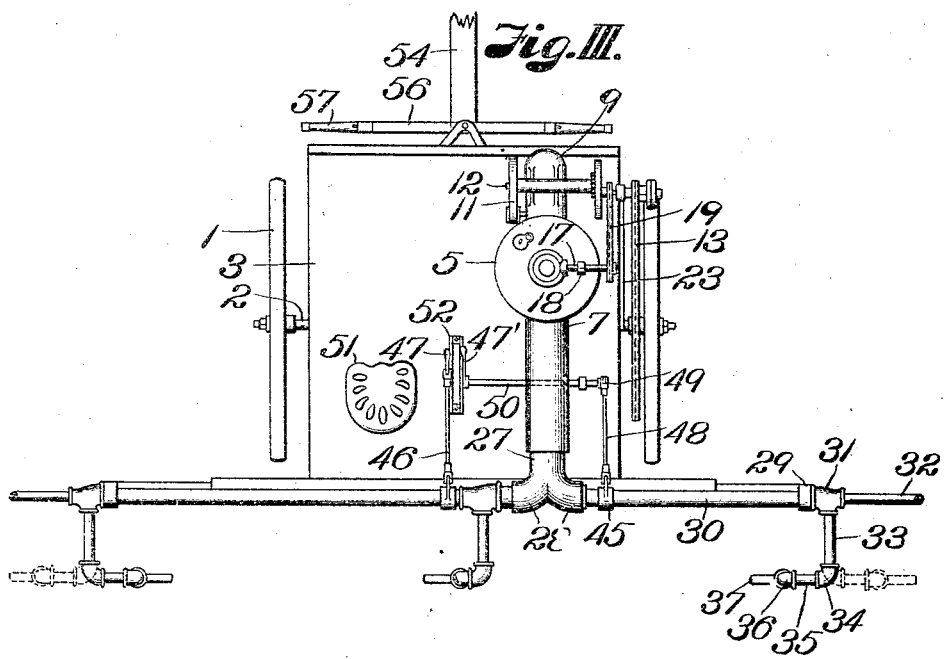
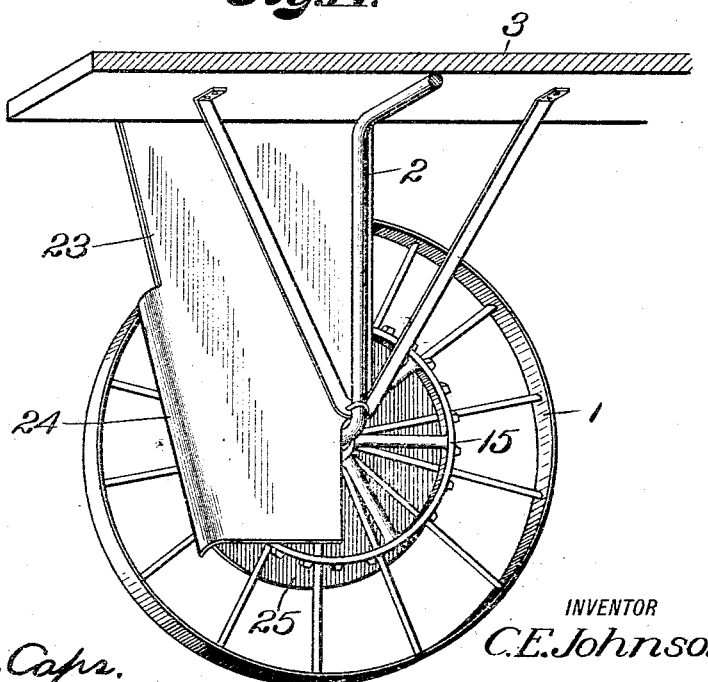

UNITED STATES PATENT OFFICE.

CHARLES E. JOHNSON, OF KANSAS CITY, MISSOURI, ASSIGNOR TO DUST SPRAYER MANUFACTURING COMPANY, OF KANSAS CITY, MISSOURI, A CORPORATION OF MISSOURI.

DUST-SPRAYING MACHINE.

1,135,288.  Specification of Letters Patent.  Patented Apr. 13, 1915.

Application filed October 17, 1913. Serial No. 795,633.

*To all whom it may concern:*

Be it known that I, CHARLES E. JOHNSON, a citizen of the United States, residing at Kansas City, in the county of Jackson and State of Missouri, have invented certain new and useful Improvements in Dust-Spraying Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a dust spraying machine, and more particularly to a machine which is adapted for travel through a field of growing cotton or like plants and for spraying medicated dust onto the foilage of the plants while the machine is in motion.

It is the principal object of the invention to provide a machine of this character having nozzles for delivering medicated dust, and which are adapted for individual adjustment to vary the delivery of the dust in accordance with the spacing of the rows, and for assembled adjustment to vary the elevation of the delivery nozzles to adapt the machine for use in a field at various periods in the growth of the plants; the sets of nozzles at opposite sides of the machine being adapted for independent adjustment in order to adapt the machine for use on hillsides or uneven ground. In accomplishing these and other objects of the invention, I have provided improved details of structure, the preferred forms of which are illustrated in the accompanying drawings, wherein:—

Figure I is a perspective view of a dust spraying machine, constructed according to my invention. Fig. II is an end view of the same, illustrating its use in a field, and illustrating by dotted lines the transverse adjustment of the individual nozzles. Fig. III is a plan view of the machine, parts of the dust conduits being removed for better illustration. Fig. IV is an enlarged detail perspective of one of the ground wheels, showing the driving sprocket and guard.

Referring more in detail to the parts: 1 designates ground wheels, 2 an arched axle and 3 a platform comprising the vehicle portion of the machine; the ground wheels being preferably of metal, and the axle arched to a sufficient height to ride over rows of plants at their full growth and the platform braced from the axle in order that it may be sufficiently rigid to carry the working parts of the machine.

Mounted on the platform 3 is a hopper 5, having a T 6 at its lower end; the rear portion of which opens into a conduit 7 and the forward portion of which communicates with the pipe 8 of a blower 9, so that when the blower is in operation, medicated dust from the hopper will be blown through the T into the rear conduit 7. The blower 9 (which may be of any suitable construction) is operated by a belt 11, from a shaft 12, which in turn is driven from one of the ground wheels by a belt 13 that runs over from a sprocket wheel 14 on the shaft, and from a sprocket wheel 15 that is fixed to the wheel 2. The hopper is also provided with a stirring mechanism (not shown), which is driven by a shaft 17 journaled in brackets 18 on the top of the hopper, and driven by a belt 19 that runs over a sprocket wheel 20 on said shaft and over a sprocket wheel 21 on the shaft 12, so that all of the operative elements of the machine are driven primarily by one of the ground wheels through the belt 13.

In order to obviate injury to the plants by their being cut between the belt 13 and its sprocket wheel, I provide a guard 23 which is secured to the platform 3 and is suspended at the inside of the ground wheel, and has a lip 24 turned over the sprocket wheel 15 and part of the chain, so that as the machine travels through a field the lip 24 will push the plants away from the chain. I also prefer to attach a plate 25 to the outside of the wheel in order to obviate the projection of foilage between the spokes of the wheel into the gearing.

Mounted in the end of the conduit 7 that projects rearwardly from the hopper is a T union 27, the members 28 of which are curved to divide dust delivered from the hopper and conduct same in opposite directions with the least possible friction at the turning point. Revolubly mounted in each of the members 28 and in the extended bearings 29 on the platform 3, is a pipe 30 which extends laterally at the back of the machine and is provided at its end with a reducing T 31; the port of the union opposite the pipe 30 being provided with a smaller pipe 32, and the port at right angles to the pipe 30 being provided with a branch 33, the fit of the pipe 30 in its bearings being sufficiently close to hold the pipe in adjusted position by friction. Pivotally mounted on the end of the branch 33 is an elbow 34, and mounted in the elbow, in a plane parallel with that of the pipe 30, is a tube 35. Pivotally mounted on the tube 35 is an elbow 36, and fixed in the elbow 36 is a nozzle 37, of any suitable type, the elbow 36 being loosely mounted on the tube 35, so that the nozzles will hang in their lowermost positions and will automatically adjust themselves when turned from one side to the other.

Fixed on the end of the small pipe 32 is an elbow 39, having a tube 40 fixed therein and extending parallel with the branch 33 and pivotally mounted on the end of the tube is an elbow 41, provided with a tube 42 having an elbow 43 thereon provided with a nozzle 37. The pipe 30 at the opposite side of the machine is similarly equipped, and fixed on each of the pipes 30 is an arm 45, one of which has a link 46 connecting same with a lever 47 and the other having a link 48 connected with an arm 49 on a rock shaft 50, which is connected with the lever 47' adjacent the first named lever, so that both levers may be operated by a person riding on the seat 51, and each of the levers being provided with a quadrant 52 whereby the levers may be held in set position.

In order that the machine may be conducted through a field of growing plants without injuring the plants, I run the tongue 54 of the machine forwardly from the level of the platform 3, so that it may overlie the plants, and use an arch-shaped neck yoke 55, the ends of which depend into proper position for connection with a horse's collar, and also provide an arch-shaped double-tree 56, that supports the swingle trees 57 at the proper elevation.

In using the machine, presuming the parts to be constructed and assembled as described, with the hopper filled with medicated dust, when the machine is driven through a field, rotation of the ground wheel will actuate the working parts of the apparatus so that powder within the hopper is stirred to provide a free flow into the distributing conduit and the blower actuated to force powder from said conduits into the distributing pipes and nozzles. When the machine is driven through the field for the first time, the tops of the plants are but a short distance above the ground, so that the nozzles should be extended to their lowest limit, the vertical adjustment being secured by rotation of the conduits 30 and extensions 32 in their bearings, under control of the levers 47; it being apparent that when the machine is used on taller plants, the nozzles may be elevated by revolving the distributing pipes in their bearing, and it also being apparent that should the machine be used on a hill-side, or in any place where the nozzles on opposite sides of the machine should be carried at different elevations, that the distributing sets may be adjusted independently of each other.

In planting cotton and other plants, it is customary to space the rows a determined distance apart, the rows of cotton plants being usually four feet between the rows, although in some localities it is customary to plant the rows five feet apart. In order to adapt the machine for use in fields wherein the rows are spaced differently, I have provided for varying the distance between adjacent nozzles, as illustrated most clearly in Fig. II, wherein *a—a* indicates 4 ft. rows, *a—c* indicates 5 ft. rows and *b—b*, the tread of the machine, which is 4½ ft., so that in adapting the machine to the two conditions the wheels will track three inches outside of the center in the first case and three inches inside of the center in the latter case. When the machine is adjusted for a 4 ft. row, and it is desired to use same in a field having 5 ft. rows, it is only necessary to pivot the elbows 34 and 41 on the branches 33 and 40, so that the nozzle tubes 35 and 42 are directed away from the longitudinal center of the machine, the mounting of the elbows 34 and 41 on their branches being sufficiently loose to allow the nozzles to drop to operative position by their own weight. With a machine having a plurality of nozzles in each distributing set, the tube 35 of each successive nozzle should be lengthened in order to compensate for the additional width of the row. It is apparent that the extension pipes may be removed from the main conduits when the machine is to be shipped.

Having thus described my invention, what I claim as new therein, and desire to secure by Letters Patent, is:—

1. A dust spraying machine comprising a dust receptacle, a distributer conduit connected with the receptacle, a plurality of nozzles, and a plurality of connections graduated in length from the inner part of the distributer conduit for connecting said nozzles to said conduit.

2. A dust spraying machine comprising a dust receptacle, a distributer conduit connected with the receptacle, a plurality of nozzles, and a plurality of connections increasing in length by a predetermined amount from the inner part of the conduit, and adapted to connect said nozzles with said conduit.

3. A dust spraying machine comprising a dust receptacle, a distributer conduit connected with the receptacle, spaced tubes projecting from and communicating with said conduit, nozzle tubes on said spaced tubes increasing in length by a predetermined amount from the inner part of the conduit, and projecting at right angles therefrom, and nozzles losely pivoted on said nozzle tubes.

4. A dust spraying machine comprising a dust receptacle a distributer conduit connected with the receptacle, spaced tubes projecting at right angles from and communicating with the conduit, a plurality of nozzles, and nozzle tubes on said spaced tubes increasing in length by a predetermined amount from the inner part of the conduit and adapted to lie parallel to said conduit; the said nozzle tubes being adapted for projection on either side of said conduit tubes to uniformly vary the distance between said nozzles.

5. In a dust spraying machine, a dust receptacle, a distributer conduit connected with the receptacle, tubes fixedly mounted on and communicating with the conduit in spaced relation to each other, nozzle tubes pivotally mounted at right angles to and communicating with the conduit tubes, whereby the said nozzle tubes may be projected from opposite sides of the conduit tubes, and nozzles mounted on the nozzle tubes.

6. In a dust spraying machine, a dust receptacle, tubes of equal length fixedly mounted at right angles to and communicating with the conduit in equally spaced relation to each other, nozzle tubes increasing in length by a predetermined amount from the inner part of the conduit and projecting at right angles from and communicating with the conduit tubes, and nozzles pendently mounted on the nozzle tubes; the nozzle tubes being adapted to project from opposite sides of said conduit tubes to uniformly vary the spacing of said nozzles.

7. A dust spraying machine comprising a dust receptacle, a plurality of pivotally mounted distributer conduits, each connected with the receptacle, nozzles loosely pivoted on said conduits, and lever mechanism for turning either of the conduits independently of the other to adjust the elevation of its nozzles.

8. A dust spraying machine comprising a dust receptacle, a plurality of pivotally mounted distributer conduits, each connected with the receptacle, equally spaced tubes projecting from said conduits, equally spaced nozzles having connections with said conduit tubes graduated from the inner part of the distributer conduit, and lever mechanism for turning either of the conduits independently of the other.

9. A dust spraying machine comprising a plurality of pivotally mounted distributer conduits having common connection with the spraying machine, a plurality of equally spaced pipes projecting at right angles to said conduits, a plurality of nozzles, and a plurality of tubes for connecting said nozzles with said pipes; the said tubes being increased in length, by a predetermined amount, from the inner part of the machine, whereby the nozzles are spaced equally and a greater distance apart than said pipes.

10. A dust spraying machine comprising a plurality of pivotally mounted distributer conduits having common connection with the spraying machine, a plurality of equally spaced pipes projecting at right angles to said conduits, a plurality of nozzles, and a plurality of tubes for connecting said nozzles with said pipes; the said tubes being increased in length by a predetermined amount from the inner part of the machine, whereby the nozzles are spaced equally and a less distance apart than said pipes.

11. A dust spraying machine comprising a dust receptacle, a plurality of pivotally mounted distributer conduits, each connected with the receptacle, nozzles loosely pivoted on said conduits, lever mechanism for turning either of the conduits independently of the other to adjust the elevation of its nozzles, and means for locking said levers in adjusted position.

12. A dust spraying machine comprising a dust receptacle, a Y-fitting having one lead communicating with said receptacle, a distributer conduit pivotally mounted in each of the other leads of said fitting, nozzles loosely pivoted on said conduits, and a hand-lever operatively connected with each distributer conduit and adapted to revolve said conduits.

13. A dust spraying machine comprising a dust receptacle, a Y-fitting having one lead communicating with said receptacle, a distributer conduit pivotally mounted in each of the other leads of said fitting, automatically adjustable nozzles on said conduits, lever mechanism for changing the elevation of said nozzles, and means for locking said lever mechanism in a predetermined position.

14. A dust spraying machine comprising a dust receptacle, a Y-fitting having one lead communicating with said receptacle, a distributer pivotally mounted in each of the other leads of said fitting, a plurality of pipes communicating with and extending at right angles to said conduits, a hand lever operatively connected to and adapted to revolve each of said conduits, a latch for holding each lever in any one of several positions, a plurality of nozzles, and means for connecting said nozzles to said pipes, whereby they are automatically maintained in functional position, irrespective of the position of the hand-levers.

In testimony whereof I affix my signature in presence of two witnesses.

CHARLES E. JOHNSON.

Witnesses:
ARTHUR W. CAPS,
L. E. COATS.